United States Patent
Lampe et al.

(10) Patent No.: US 11,899,826 B2
(45) Date of Patent: Feb. 13, 2024

(54) SECURITY CONTROLLER AND METHOD FOR PROCESSING DATA ELEMENTS OF A DATA ARRAY

(71) Applicant: Infineon Technologies AG, Neubiberg (DE)

(72) Inventors: Christoph Lampe, Augsburg (DE); Martin Steinbach, Augsburg (DE)

(73) Assignee: Infineon Technologies AG, Neubiberg (DE)

( * ) Notice: Subject to any disclaimer, the term of this patent is extended or adjusted under 35 U.S.C. 154(b) by 236 days.

(21) Appl. No.: 17/547,906

(22) Filed: Dec. 10, 2021

(65) Prior Publication Data
US 2022/0198066 A1    Jun. 23, 2022

(30) Foreign Application Priority Data
Dec. 22, 2020  (DE) .......................... 102020134618.2

(51) Int. Cl.
*G06F 21/72* (2013.01)

(52) U.S. Cl.
CPC .................................... *G06F 21/72* (2013.01)

(58) Field of Classification Search
CPC ........... G06F 21/70; G06F 21/71; G06F 21/72
See application file for complete search history.

(56) References Cited

U.S. PATENT DOCUMENTS

2020/0012782 A1* 1/2020 Knezevic ................ H04L 9/003
2022/0129547 A1* 4/2022 Kwon ........................ G06F 7/24

FOREIGN PATENT DOCUMENTS

EP          1421461 B1    11/2011

OTHER PUBLICATIONS

Veyrat-Charvillon, Nicolas, et al., "Shuffling Against Side-Channel Attacks: a Comprehensive Study with Cautionary Note", Universite catholique de Louvain, UCL Crypto Group, B-1348 Louvain-la-Neuve, Belgium, 1-18.
Lemire, Daniel, "Fast Random Integer Generation in an Interval", Université du Québec (TELUQ), Canada, Dec. 28, 2018, 1-13.

* cited by examiner

*Primary Examiner* — D'Arcy Winston Straub
(74) *Attorney, Agent, or Firm* — Murphy, Bilak & Homiller, PLLC

(57) ABSTRACT

According to an embodiment, a security controller is described comprising a memory storing data elements of a data array and a processing circuit configured to determine a power of two such that number of data elements is higher than the power of two but at most equal to double the power of two, determine random first and second integers, change indices of a predefined sequence of indices, comprising performing a first change of the index according to a first permutation if it is lower than the power of two, performing a second change of the index by adding a third integer modulo data array length and performing a third change of the index by a second permutation if it is, following the second change, lower than the power of two, and process the data elements in an order of the changed indices.

22 Claims, 3 Drawing Sheets

SECURITY CONTROLLER AND METHOD FOR PROCESSING DATA ELEMENTS OF A DATA ARRAY

TECHNICAL FIELD

The present disclosure relates to security controllers and methods for processing data elements of a data array.

BACKGROUND

In the context of security-relevant applications, computer chips, such as those on a smart card or in a control device in a vehicle, typically perform cryptographic methods for encryption, decryption and authentication, etc. In such cryptographic methods, data is typically processed, such as cryptographic keys, which are to be protected from access by an attacker (e.g., via side-channel attacks). A cryptographic method (or algorithm) may allow data to be processed in arbitrary order. This allows, in an implementation of the cryptographic method, shuffling the order in which the data are processed as a side-channel attack countermeasure.

For shuffling the processing order, complex methods for generating uniformly distributed permutations may be used. However, those are typically unsuitable for use in most performance-critical code, since these methods require significant processing time, memory and a significant amount of entropy (to be provided by a random number source). On the other hand, simpler shuffling algorithms may be ineffective against dedicated attacks.

Therefore, approaches for processing data in permuted order are desirable which are effective against side-channel attacks and at the same time can be implemented with reasonable hardware requirements.

SUMMARY

According to an embodiment, a security controller is provided, including a memory storing data elements of a data array, wherein the data array has a number of data elements given by a length of the data array, and a processing circuit. The processing circuit is configured to determine a power of two such that number of data elements is higher than the power of two but at most equal to double the power of two, determine a random first integer, determine a random second integer, and change indices of a predefined sequence of indices between zero and the length of the data array minus one, where changing an index includes
- performing a first change of the index if the index is lower than the power of two, wherein the first change includes changing the index according to a first permutation of non-negative numbers smaller than the power of two and wherein the first permutation depends on the random first integer;
- performing a second change of the index, wherein the second change includes adding a third integer to the index modulo data array length; and
- performing a third change of the index if the index, following the second change, is lower than the power of two, wherein the third change includes changing the index according to a second permutation of non-negative numbers smaller than the power of two and wherein the second permutation depends on the random second integer.

The processing circuit is further configured to process the data elements in an order given by the changed indices.

According to a further embodiment, a method for processing data elements of a data array according to the processing circuit described above is provided.

BRIEF DESCRIPTION OF THE FIGURES

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

The following detailed description refers to the accompanying drawings that show, by way of illustration, specific details and aspects of this disclosure in which the invention may be practiced. Other aspects may be utilized, and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
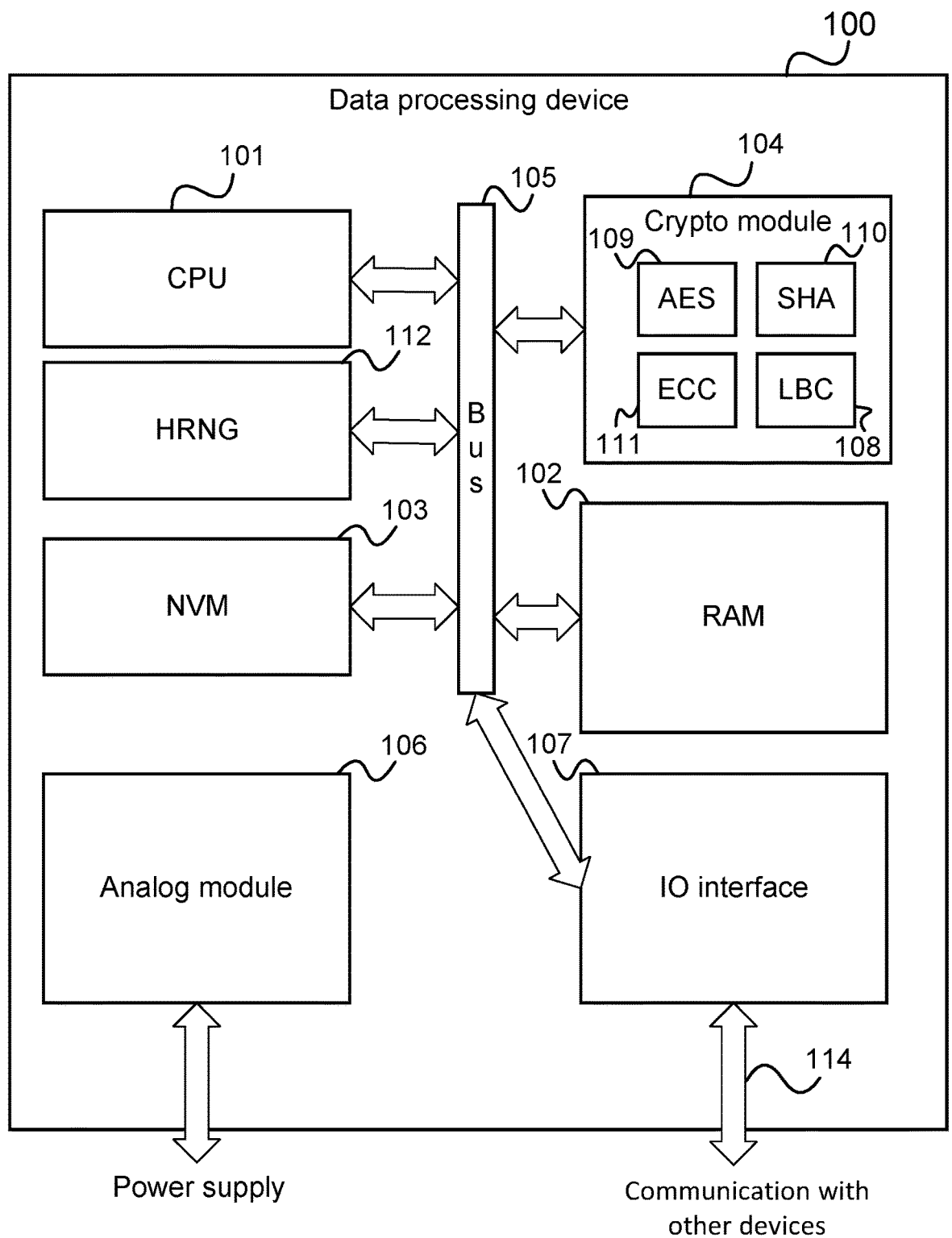
FIG. 1 shows an example of a data processing device for performing cryptographic operations.

FIG. 1 shows an example of a data processing device, e.g., for performing a cryptographic method.

The data processing device 100 may for example be a security controller, e.g., in a vehicle, e.g., an ECU (Electronic Control Unit) in a car. It may also be a chip card integrated circuit (IC) of a smart card such as a smart card of any form factor, e.g., for a passport or for a SIM (Subscriber Identity Module).

The data processing device 100 includes a CPU (central processing unit, i.e., a main processor) 101, a RAM (random access memory) 102, a non-volatile memory 103 (NVM), a crypto module 104, an analog module 106, an input/output interface 107, and a (e.g., hardware) random number generator 112. It will be appreciated that each of these modules forming part of data processing device 100 comprise digital and/or analog circuitry.

In this example, the CPU 101 has access to at least one crypto module 104 via a common bus 105 to which each crypto module 104 is connected. In particular, each crypto module 104 may include one or more crypto cores 108 to 111 to perform certain cryptographic operations.

The CPU 101, the hardware random number generator 112, the NVM 103, the crypto module 104, the RAM 102, and the input/output interface 107 are connected to the bus 105. The input/output interface 107 may have a connection 114 to other devices similar to the data processing device 100.

Electrical power is supplied to the analog module 106 via an electrical contact and/or via an electromagnetic field. This energy is supplied to drive the circuitry of the data processing device 100, and in particular may allow the input/output interface to initiate and/or maintain connections to other devices via the connection 114.

Instructions for performing the processing and procedures described below may in particular be stored in the NVM 103 and processed by the CPU 101. The processed data may be stored in the NVM 103 or in the RAM 102. Random numbers are provided by the hardware random number generator 112.

Cryptographic operations may be performed exclusively or at least partially on the crypto module 104. However, they may also be performed by the CPU 101 and a dedicated crypto module 104 may not be required.

The components of the data processing device 100 may be implemented on a single chip, for example. The data processing device 100 may be a smart card (or smart card module) powered by direct electrical contact or by an electromagnetic field. The data processing device 100 may be a fixed circuit or based on reconfigurable hardware (e.g., field programmable gate array, FPGA). The data processing device 100 may be connected to a personal computer, microcontroller, FPGA, or smartphone system on a chip (SoC) or other components of a smartphone. The data processing device 100 may be a chip that acts as a Trusted Platform Module (TPM) and provides cryptographic functionality according to a standardized interface to a computer, smartphone, Internet of Things (IoT) device, or vehicle. However, the data processing device 100 may itself be a standalone data processing device, e.g., a personal computer, smartphone, etc.

When performing cryptographic operations such as decrypting encrypted data or signing data, secret data such as a cryptographic key are typically used. To ensure security, it is necessary to prevent an attacker from gaining information about such secret data, for example through a side-channel attack.

One approach to protect against side-channel attacks is shuffling the order in which data are processed. In practice this may be done by shuffling the iteration order of some loop, i.e., if a loop iterates over the indices $\{0, \ldots, n-1\}$ for some $n>0$, then in the ith loop iteration the data with index $\sigma(i)$ is processed, where a is a randomly chosen permutation.

Thus, the shuffling for the execution of a cryptographic algorithm can be divided into:

1. Randomly choosing a permutation $\sigma$, once per execution of the cryptographic algorithm, by using some given entropy (from an entropy source such as a random number generator).
2. Calculating the permuted index $\sigma(i)$ for each loop index $i \in \{0, \ldots, n-1\}$.
3. Processing the data element having a data element index $\sigma(i)$ in the ith loop iteration.

Generally, a sequence of indices is permuted from 0 to n-1 and data elements are processed according to the permuted index sequence.

According to various embodiments a permutation (or shuffling) method is provided that provides a reasonable compromise between sufficiently random shuffling and performance. Specifically, according to various embodiments, the permutation method has the following properties:

(i) The permutation method works for any given $n>0$ and still behaves similarly for different values of n. It should be noted that for special cases of n, e.g., if n is a power of two, especially tailored algorithms may be used with significant performance or security benefits. Whether such algorithms can be used usually depends on the given use case and the cryptographic method used. Thus, an approach satisfying the present property (i) is much more versatile.

(ii) The permutation method only uses simple elementary operations, e.g., instructions available on a reduced instruction set computer (RISC), so it can be implemented on most embedded devices. This also ensures that the permutation method can be implemented efficiently.

(iii) The permutation method can be implemented with low memory demand.

(iv) The permutation method can be implemented efficiently without conditional jumps. So, side-channel attacks on the permutation method itself or internal randomization parameters are more difficult than in an approach using conditional jumps.

(v) The permutations generated are close to be uniformly distributed.

(vi) The permutations generated satisfy properties in their shuffling behavior in order to be effective as a side-channel countermeasure.

According to various embodiments, the permutation method generates a random permutation by obtaining some random bits from an entropy source (e.g., random number generator 112) and pre-calculates an encoding for the chosen permutation (i.e., sets random parameters for the permutation). The permutation is then for example applied to a loop in a cryptographic method. For example, the CPU 101 (or alternatively the crypto module 104) executes a loop and calculates the loop iteration index for a current iteration. If the current iteration is the ith iteration that is executed, the CPU 101 calculates the loop iteration index for the current iteration as $\sigma(i)$ such that it in effect it performs the $\sigma(i)$-th iteration as the ith iteration. Accordingly, the CPU 101 processes data elements in the ith iteration which were originally destined for the $\sigma(i)$-th iteration; in that sense, the CPU 101 may also be seen to permute the data elements which are processed in the loop iterations.

The CPU 101 calculates $\sigma(i)$ by a sequence of modular operations. According to one embodiment, these are a first multiplication, a first addition, a second multiplication and (optionally) a second addition. As described further below, according to another embodiment, the multiplications may also be replaced by other types of (sub-)permutations.

The CPU 101 performs each of the multiplications (or generally (sub-)permutations) and the additions with a suitable modulus and parameters as given by the encoded permutation. After it has calculated a new (changed) index for an original index, the CPU 101 performs regular data processing, where the processed data elements depend on the changed index.

In the following, a first embodiment is described where the permutation includes a sequence of a first multiplication, a first addition, a second multiplication and a second addition. This means that the permutation of the set $\{0, \ldots, n-1\}$ (where n is an arbitrary but fixed positive integer) is built by sequential application of simpler shuffling patterns (i.e. sub-permutations), namely modular addition and modular multiplication.

The modular addition and the modular multiplication as sub-permutation are defined as follows:

Modular Addition Sub-Permutation

For $r \in \{0, \ldots, n-1\}$ the modular addition sub-permutation is defined as $$a_r: \{0, \ldots, n-1\} \to \{0, \ldots, n-1\}\; i \mapsto i+r \bmod n.$$

Modular Multiplication Sub-Permutation

For $r \in \{1, 3, \ldots, 2^k-1\}$, where $k \in \mathbb{Z}$ such that $2^k < n \leq 2^{k+1}$, the modular multiplication sub-permutation is defined as $$m_r: \{0, \ldots, n-1\} \to \{0, \ldots, n-1\}$$

$$i \mapsto \begin{cases} ri \mod 2^k & \text{if } i < 2^k \\ i & \text{else} \end{cases}.$$

Since the number $2^k$ and the odd number r are coprime, the restricted map $$m_r|_{\{0, \ldots, 2^k-1\}}: \{0, \ldots, 2^k-1\} \to \{0, \ldots, 2^k-1\}$$

is a permutation. Thus, also the map $m_{n,r}$ is a permutation.

The set of permutations resulting from performing a first modular multiplication sub-permutation, a first modular addition sub-permutation, second modular multiplication sub-permutation and a second modular addition sub-permutation as described above is given by $$\text{MaMA}(n) = \{a_t m_s a_{2^k} m_r | r, s \in \{1, 3, \ldots, 2^k-1\}, t \in \{0, 1, \ldots, n-1\}\}$$

where $k \in \mathbb{Z}$ such that $2^k < n \leq 2^{k+1}$.

The set MaMA(n) is a set of permutations, because each element is a composition of a modular multiplication with r, a modular addition with $2^k$, a modular multiplication with s and modular addition with t. It should be noted that the notation means that in the composition of the sub-permutations the sub-permutations are performed from right to left. The name MaMA is an acronym for multiplication, addition, multiplication, addition, which describes the order in which a given index is changed. The first 'a' is not capitalized, because this addition is a modular addition by a constant for fixed n, and is thus different from the other operations, which depend on randomly chosen parameters and thus add entropy. The constant addition serves to ensure that the elements left invariant under the first multiplication are permuted by the second multiplication.

In context of the first embodiment, an encoding of a permutation is a quadruple (n, r, s, t) with $$r, s \in \{1, 3, \ldots, 2^k-1\} \text{ and } t \in \{0, \ldots, n-1\}.$$

Thus, the set of encodings for a fixed n is given by $$E_n = \{1, 3, \ldots, 2^k-1\}^2 \times \{0, 1, \ldots, n-1\}$$

Each encoding (n, r, s, t) then defines (and thus encodes) a permutation $a_t m_s a_{2^k} m_r \in \text{MaMA}(n)$. Since each encoding defines a permutation, choosing a random permutation is equivalent to choosing a random encoding. The CPU 101 may choose a random encoding by choosing random numbers (r, s, t) with r, $s \in \{1, 3, \ldots, 2^{k-1}\}$ and $t \in \{0, \ldots, n-1\}$. A typical random number generator generates random numbers as chunks of random bits of fixed size. A random value may thus be uniformly sampled from $\{1, 3, \ldots, 2^{k-1}\}$ by sampling k random bits and setting the least significant bit. Sampling (uniformly) from $\{0, 1, \ldots, n-1\}$ is efficiently possible, too.

Procedure "PermuteIndex" given below allows efficiently computing the changed (i.e., permuted) index for a given index and the encoding of a permutation. The encoding is generated by procedure "GenerateRandomEncoding" below. For practical purposes, a parameter b is added to the encoding, because this allows to do some of the required calculations for calculating permuted indexes more efficiently. The value of this new parameter is given by $$b = 2^k - 1 = 2^{\lfloor \log_2(n-1) \rfloor} - 1$$

wherein the brackets $\lfloor . \rfloor$ indicate the floor operator.

```
GenerateRandomEncoding
Input: n Number of elements
Output: (n, b, r, s, t) Encoded permutation
1: procedure GenerateRandomEncoding(n)
2:   b := 2^⌊log_2(n-1)⌋ - 1 (Efficiently computable using bit shifts)
3:   r := random value in {1, 3, . . . , b}
4:   s := random value in {1, 3, . . . , b}
5:   t := random value in {0, 1, . . . , n - 1}
6:   return (n, b, x, y, z)
7: end procedure
```

```
PermuteIndex
Input: (n, b, r, s, t) (Encoded permutation σ)
i (index to be permuted)
Output: j Permuted index, i.e. j = _(i)
1: procedure PermuteIndex((n, b, r, s, t), i)
2:   j := i
3:   if j ≤ b then
4:     j := jr mod b + 1 (Modular multiplication with r)
5:   end if
6:   j := j + b + 1 mod n (Modular addition with b + 1)
7:   if j ≤ b then
8:     j := js mod b + 1 (Modular multiplication with s)
9:   end if
10:  j := j + t mod n (Modular addition with t)
11:  return j
12: end procedure
```

Regarding the properties (i) to (vi) given above it should be noted that for the permutation method of the first embodiment:

(i) The permutation method works for arbitrary n>0. Depending on how n relates to $2^k$, some indices are multiplied either by only one modular multiplication or both.

(ii) The method uses modular addition and modular multiplication. While implementing these may be problematic for some hardware platforms for arbitrary values, the values used in the permutation method allow using basic arithmetic and bitwise operations to achieve the same result. The reduction modulo b+1 is realizable by bitwise AND with b, since b+1 is a power of two. Similarly, modular reduction of the sum j+t modulo n is also efficiently computable, because $0 \leq j+t < 2n$.

(iii) The permutation method's memory demand does not extend beyond the memory required for a permutation encoding. For many practical applications, $n < 2^{16}$ is sufficient, i.e., it is sufficient to use 16-bit unsigned integers for the encoding values n, b, r, s, t, which means a permutation encoding is small enough to be kept inside the CPU registers of a typical microcontrollers. This is both beneficial to performance as well as side-channel security, since it eliminates the need to load these values from memory in each loop iteration.

(iv) The permutation method may be implemented without conditional jumps (see exemplary C implementation below).

(v) and (vi) It can be shown that the generated permutations are close to randomly chosen random permutations. For example, it can be shown that the probability that a (randomly chosen) permutation of MaMA maps the index i to index j is 1/n.

In the following, an implementation of the permutation method of the first embodiment is given to show exemplary implementation details. It is assumed that rand( ) is an entropy source, providing 16-bit random values.

The following is an implementation example for the procedure GenerateRandomEncoding.

```
1   void GenerateRandomEncoding ( uint16_t n, uint16_t *b, uint16_t *r, uint16_t*s, uint16_t *t)
2   {
3   // Calculate b = 2^floor( log (n −1)) −1
4   *b = n-1;
5   *b |= (*b) >> 1;
6   *b |= (*b) >> 2;
7   *b |= (*b) >> 4;
8   *b |= (*b) >> 8;
9   *b >>= 1;
10  // Choose random r, s from {1 ,3 ,... , b} uniformly distributed
11  *r = (((( uint16_t) rand ( )) & (*b)) | 1);
12  *s = (((( uint16_t) rand ( )) & (*b)) | 1);
13  // Choose random t from {0 ,... , n −1} fairly uniformly distributed
14  *t = ((( uint16_t) rand ( )) * ( uint32_t )n) >> 16;
15  }
```

It should be noted that sampling t as described above means that the distribution is not quite uniform. Nevertheless, the mapping is fair and thus typically sufficient in practical application.

The following is an implementation example of a function containing a loop, where iterations are shuffled with using the permutation method of the first embodiment. In particular, inside the loop, the procedure PermuteIndex is implemented. It should be noted that this implementation has no conditional jumps.

In the following, a second embodiment is described where the permutation includes a sequence of a first sub-permutation, an addition and a second sub-permutation. Like in the first embodiment, this means that the permutation of the set $\{0, \ldots, n-1\}$ (where n is an arbitrary but fixed positive integer) is built by sequential application of simpler shuffling patterns (i.e. sub-permutations).

The first sub-permutation and the second sub-permutation may each be an addition, a multiplication, a bitwise XOR or a bitwise rotation.

Modular Addition Sub-Permutation

For $r \in \{0, \ldots, n-1\}$ (r may also be an arbitrary integer) the modular addition sub-permutation is defined as $$a_r: \{0, \ldots, n-1\} \to \{0, \ldots, n-1\}\ i \mapsto i+r \mod n.$$

```
1   void PermuteIndices ( uint16_t n, uint16_t b, uint16_t r, uint16_t s, uint16_t t)
2   {
3     uint16_t i;
4     // The iterations of this loop are shuffled by the permutation encoded by (n,b,r,s,t)
5     for (i=0;i<n;i++)
6     {
7       // The inner part of this loop is an implementation of the PermuteIndex function
8       uint16_t p,m;
9       uint32_t j = ( uint32_t )i;
10      // Multiplication
11      m = (j*r) & b; // Multiplication mod b+1
12      p = ( uint16_t)((( uint32_t )0-( uint32_t )(j & (b + 1))) >> 16);// Build jumpless multiplexer mask p
13      j = m ^ (p & (j ^ m)); // j = m, if j < b+1, else j = j
14      // addition , to swap multiplied and unmultiplied parts
15      j += (b + 1);
16      j -=n;
17      j += n & (j >> 16);
18      // Multiplication
19      m = (j*s) & b;
20      p = ( uint16_t)((( uint32_t )0-( uint32_t )(j & (b + 1))) >> 16);
21      j = m ^ (p & (j ^ m));
22      // Addition
23      j += t;
24      j -=n;
25      j += n & (j >> 16);
26      // Here data processing with the permuted index j can be done .
27      //...
28    }
29  }
```

Modular Addition Sub-Permutation

For $r \in \{1, 3, \ldots, 2^k-1\}$ (r may also be an arbitrary odd positive integer), where $k \in \mathbb{Z}$ such that $2^k < n \leq 2^{k+1}$, the modular multiplication sub-permutation is defined as $$m_r:\{0, \ldots, n-1\} \to \{0, \ldots, n-1\}$$

$$i \mapsto \begin{cases} ri \mod 2^k & \text{if } i < 2^k \\ i & \text{else} \end{cases}.$$

Bitwise Exclusive-OR Sub-Permutation

For $r \in \{0, \ldots, 2^k-1\}$ (r may also be an arbitrary nonnegative integer), where $k \in \mathbb{Z}$ such that $2^k < n \leq 2^{k+1}$, the bitwise XOR sub-permutation is defined as $$x_r:\{0, \ldots, n-1\} \to \{0, \ldots, n-1\}$$

$$i \mapsto \begin{cases} r \operatorname{xor} i \mod 2^k & \text{if } i < 2^k \\ i & \text{else} \end{cases}.$$

Bitwise Rotation Sub-Permutation

For $r \in \{0, \ldots, k-1\}$ (r may also be an arbitrary integer), where $k \in \mathbb{Z}$ such that $2^k < n \leq 2^{k+1}$, the bitwise rotation sub-permutation is defined as $$S_r:\{0, \ldots, n-1\} \to \{0, \ldots, n-1\}$$

$$i \to \begin{cases} i_{(k-1+r) \bmod k} i_{(k-2+r) \bmod k} \ldots i_{(0+r) \bmod k} \mod 2^k & \text{if } i < 2^k (\text{i.e. } i_k = 0) \\ i & \text{else} \end{cases},$$

where $i = i_k i_{k-1} \ldots i_0 = \sum_{j=0}^{k} i_j 2^j$ is the binary representation of $i$.

The set of permutations resulting from performing a first one of the above sub-permutations, a modular addition sub-permutation and a second one of the above sub-permutations is given by $$PAP(n) = \{pa_s q | p, q \in P, s \in \mathbb{Z}\}$$

where $k \in \mathbb{Z}$ such that $2^k < n \leq 2^{k+1}$ and $$P = \{m_r | r \in \mathbb{N}, r \text{ odd}\} \cup \{a_r | r \in \mathbb{Z}\} \cup \{x_r | r \in \mathbb{N}_0\} \cup \{s_r | r \in \mathbb{Z}\}$$

The set PAP(n) is a set of permutations, because each element is a composition of permutations.

According to one embodiment, s is limited giving rise to an achievable set of permutations $$PAP'(n) = \{pa_s q | p, q \in P, s \in \mathbb{Z} \text{ such that } (s \mod n) \in \{n-2^k, \ldots, 2^k\}\} \subset PAP(n)$$

which has better random permutations than PAP(n): for example, if s $\in \{0, \ldots, n-2^k\}$, then $pa_s q(i) = i+s$ for all $i \in \{2^k, \ldots, n-1-s\}$. *In particular, for s=0*, $pa_s q(i) = i$ for all $i \in \{2^k, \ldots, n-1\}$.

The most important permutations in P for randomness are the modular multiplications and the bitwise XOR. The bitwise rotations are unsuitable to increase the entropy of the generated permutations.

Figure 2:
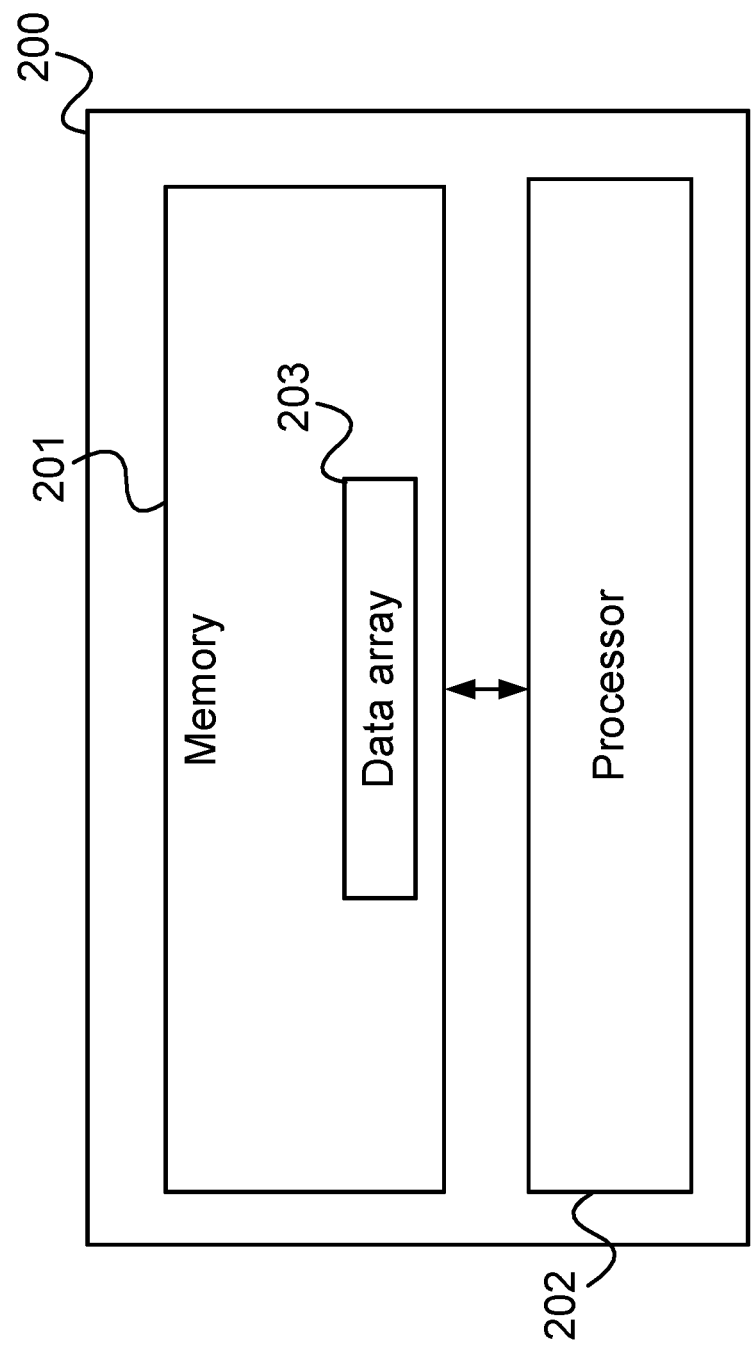
FIG. 2 shows a security controller according to an embodiment.

In summary, according to various embodiments, a security controller (e.g., corresponding to the data processing device 100 of FIG. 1) is provided as illustrated in FIG. 2.

FIG. 2 shows a security controller 200 according to an embodiment.

The security controller 200 includes a memory 201 storing data elements of a data array 203, wherein the data array has a number of data elements given by a length of the data array.

The security controller 200 further includes a processing circuit 202 configured to determine a power of two such that number of data elements is higher than the power of two but at most equal to double the power of two; determine a random first integer; determine a random second integer; and change indices of a predefined sequence of indices between zero and the length of the data array minus one.

Changing an index includes:

performing a first change of the index if the index is lower than the power of two, wherein the first change includes changing the index according to a first permutation of non-negative numbers smaller than the power of two and wherein the first permutation depends on the random first integer;

performing a second change of the index, wherein the second change includes adding a third integer to the index modulo data array length; and performing a third change of the index if the index, following the second change, is lower than the power of two, wherein the third change includes changing the index according to a second permutation of non-negative numbers smaller than the power of two and wherein the second permutation depends on the random second integer.

The processing circuit 202 is further configured to process the data elements in an order given by the changed indices.

According to various embodiments, in other words the processing order of a plurality of data elements is randomly determined by, starting from an initial indexing of the data elements, changing (i.e., permuting) the indices. The first part of the indices (lower than the determined power of 2, e.g. about the first half of the indices) is permuted by a first iteration and then the indices are shifted such that in indices of the first part of the indices and of the second part of the indices are exchanged with each other and then again the first part of indices (which due to the preceding modular addition contains indices which were originally in the second part) are permuted with a second permutation.

The indices may, for example, correspond to iteration indices of a loop or to data elements of data to be processed (e.g., different parts of a cryptographic key). For example, each data element is processed in a loop iteration and thus the determined permutation determines in which order the data element are processed in a sequence of loop iterations.

The data elements may for example also be specifications (e.g., addresses) of program instructions such that the permutation of the data elements of the data array causes a permutation of the execution of program instructions (wherein each data element may include a single program instruction or a whole block of program instructions). For example, the program instructions are instructions of a program for carrying out a cryptographic method.

Determining a random integer (of a certain property, e.g., within a certain value range) may be understood as randomly determining the integer within a set of integers (e.g., the integers of the property, e.g., within the certain value range), for example according to a uniform sampling among the integers. The random determination may be performed based on an output of a random number generator.

Figure 3:
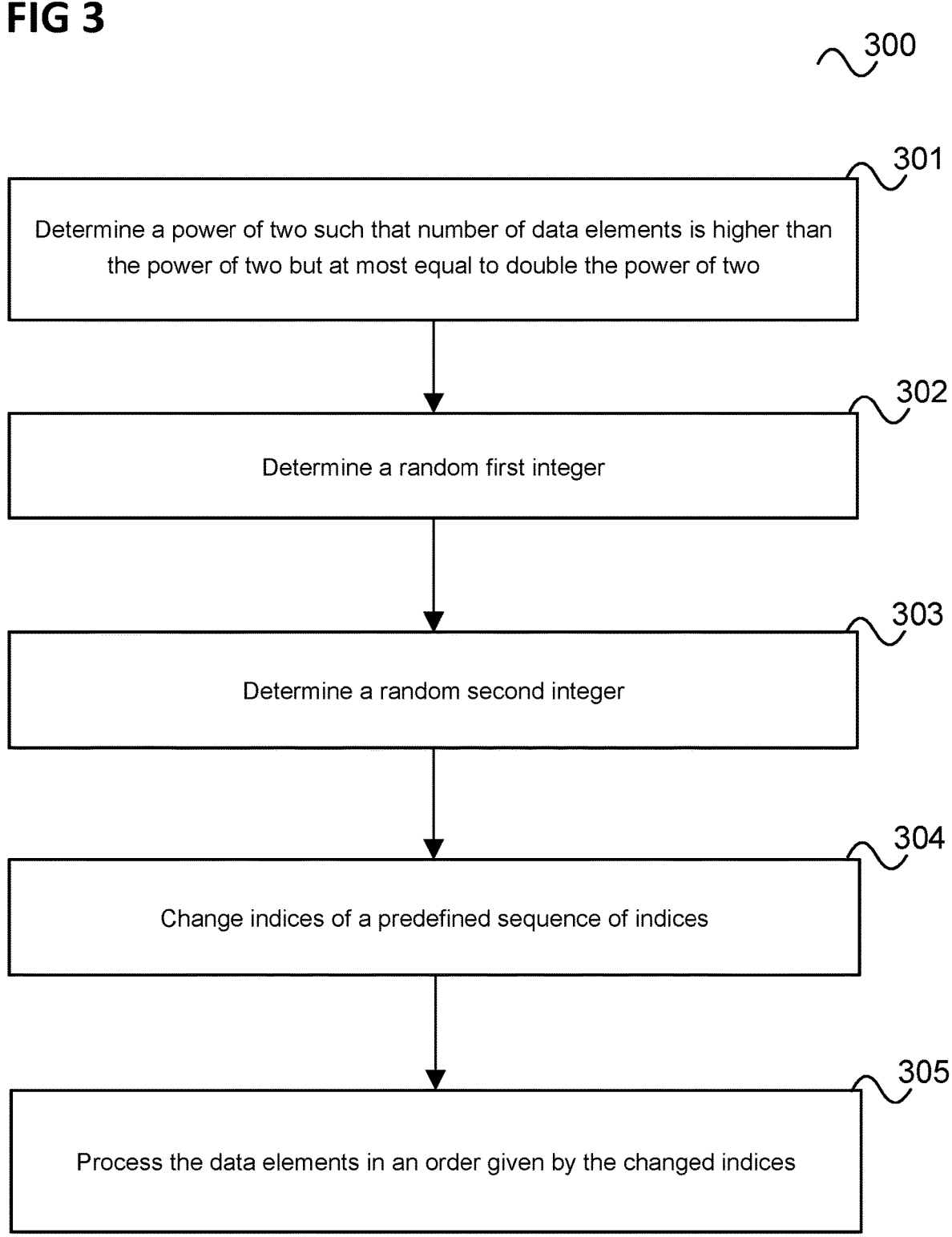
FIG. 3 shows a flow diagram illustrating a method for processing data elements of a data array stored in a memory of a security controller.

FIG. 3 shows a flow diagram 300 illustrating a method for processing data elements of a data array stored in a memory of a security controller.

The data array has a number of data elements given by a length of the data array.

In 301, a power of two is determined such that number of data elements is higher than the power of two but at most equal to double the power of two.

In 302, a random first integer is determined.

In 303, a random second integer is determined.

In 304, indices of a predefined sequence of indices between zero and the length of the data array minus one, are changed.

Changing an index includes:

Performing a first change of the index if the index is lower than the power of two, wherein the first change includes changing the index according to a first permutation of non-negative numbers smaller than the power of two and wherein the first permutation depends on the random first integer;

Performing a second change of the index, wherein the second change includes adding a third integer to the index modulo data array length; and Performing a third change of the index if the index, following the second change, is lower than the power of two, wherein the third change includes changing the index according to a second permutation of non-negative numbers smaller than the power of two and wherein the second permutation depends on the random second integer.

In 305, the data elements are processed in an order given by the changed indices.

It should be noted that 301 to 305 do not have necessarily be performed in the order shown in FIG. 3.

Various rxamples are described in the following:

Example 1 is a security controller as described with reference to FIG. 2.

Example 2 is the security controller of Example 1, wherein the first permutation is one of an addition of the random first integer modulo the data array length, a multiplication by the random first integer modulo the data array length, a bitwise exclusive-or combination with the random first integer or a bitwise rotation by the random first integer.

Example 3 is the security controller of Example 1, wherein the first permutation is a bitwise exclusive-or and the random first integer is a non-negative integer.

Example 4 is the security controller of Example 1, wherein the first permutation is a multiplication modulo the data array length and the random first integer is an odd positive integer.

Example 5 is the security controller of any one of Examples 1 to 4, wherein the second permutation is one of an addition of the random second integer modulo the data array length, a multiplication by the random second integer modulo the data array length, a bitwise exclusive-or combination with the random second integer or a bitwise rotation by the random second integer.

Example 6 is the security controller of any one of Examples 1 to 4, wherein the second permutation is a multiplication modulo the data array length and the random second integer is an odd positive integer.

Example 7 is the security controller of any one of Examples 1 to 6, wherein the second permutation is a bitwise exclusive-or and the random second integer is a non-negative integer.

Example 8 is the security controller of any one of Examples 1 to 7, wherein the third integer is an integer predetermined to have a remainder modulo the data array length which is between the data array length minus the power of two and the power of two.

Example 9 is the security controller of Example 1, wherein the first permutation is a multiplication by the random first integer modulo the data array length and the second permutation is a multiplication modulo the data array length by the random second integer.

Example 10 is the security controller of Example 9, wherein the random first integer and the random second integer are odd positive integers.

Example 11 is the security controller of Example 9 or 10, wherein the random first integer and the random second integer are smaller than the power of two.

Example 12 is the security controller of any one of Examples 9 to 11, wherein the third integer is the power of two.

Example 13 is the security controller of any one of Examples 9 to 12, wherein the processing circuit is configured to determine a random fourth integer and changing the index further includes performing a fourth change of the index, wherein the fourth change includes adding the random fourth integer to the index modulo data array length.

Example 14 is the security controller of Example 13, wherein the fourth integer is a non-negative integer smaller than the data array length.

Example 15 is the security controller of any one of Examples 1 to 14, wherein the sequence of indices is a sequence of indices of loop iterations.

Example 16 is the security controller of Example 15, wherein each data element has a data element index specifying its position in the data array and wherein the processing circuit is configured to process the data elements in a sequence of loop iterations, wherein the data element processed in a loop iteration is the data element having the data element index equal to the changed loop iteration index of the loop iteration.

Example 17 is the security controller of any one of Examples 1 to 14, wherein each data element has a data element index specifying its position in the data array and the sequence of indices is the sequence of data element indices of the data array.

Example 18 is the security controller of Example 17, wherein the processing circuit is configured to process the data elements in a sequence of loop iterations, wherein the data element processed in a loop iteration is the data element having the number of the loop iteration as changed index.

Example 19 is the security controller of any one of Examples 1 to 18, wherein the memory includes a random-access memory, a non-volatile memory, a read-only memory or one or more processor registers.

Example 20 is the security controller of any one of Examples 1 to 19, wherein the processing circuit is configured to process the data elements for performing a cryptographic method and wherein the data elements contain data to be cryptographically processed by the cryptographic method.

Example 21 is the security controller of any one of Examples 1 to 20, wherein the data elements include data to be decrypted or to be encrypted, a cryptographic key, data for a cryptographic key exchange and/or a cryptographic signature.

Example 22 is a method for processing data elements of a data array stored in a memory of a security controller as described with reference to FIG. 3

Example 23 is the method of Example 22, wherein the first permutation is one of an addition of the random first integer modulo the data array length, a multiplication by the random first integer modulo the data array length, a bitwise exclusive-or combination with the random first integer or a bitwise rotation by the random first integer.

Example 24 is the method of Example 22, wherein the first permutation is a bitwise exclusive-or and the random first integer is a non-negative integer.

Example 25 is the method of Example 22, wherein the first permutation is a multiplication modulo the data array length and the random first integer is an odd positive integer.

Example 26 is the method of any one of Examples 22 to 25, wherein the second permutation is one of an addition of the random second integer modulo the data array length, a multiplication by the random second integer modulo the data array length, a bitwise exclusive-or combination with the random second integer or a bitwise rotation by the random second integer.

Example 27 is the method of any one of Examples 22 to 25, wherein the second permutation is a multiplication modulo the data array length and the random second integer is an odd positive integer.

Example 28 is the method of any one of Examples 22 to 27, wherein the second permutation is a bitwise exclusive-or and the random second integer is a non-negative integer.

Example 29 is the method of any one of Examples 22 to 28, wherein the third integer is an integer predetermined to have a remainder modulo the data array length which is between the data array length minus the power of two and the power of two.

Example 30 is the method of Example 22, wherein the first permutation is a multiplication by the random first integer modulo the data array length and the second permutation is a multiplication modulo the data array length by the random second integer.

Example 31 is the method of Example 30, wherein the random first integer and the random second integer are odd positive integers.

Example 32 is the method of Example 30 or 31, wherein the random first integer and the random second integer are smaller than the power of two.

Example 33 is the method of any one of Examples 30 to 32, wherein the third integer is the power of two.

Example 34 is the method of any one of Examples 30 to 33, including determining a random fourth integer, wherein changing the index further includes performing a fourth change of the index, wherein the fourth change includes adding the random fourth integer to the index modulo data array length.

Example 35 is the method of Example 34, wherein the fourth integer is a non-negative integer smaller than the data array length.

Example 36 is the method of any one of Examples 22 to 35, wherein the sequence of indices is a sequence of indices of loop iterations.

Example 37 is the method of Example 36, wherein each data element has a data element index specifying its position in the data array and the method includes processing the data elements in a sequence of loop iterations, wherein the data element processed in a loop iteration is the data element having the data element index equal to the changed loop iteration index of the loop iteration.

Example 38 is the method of any one of Examples 22 to 35, wherein each data element has a data element index specifying its position in the data array and the sequence of indices is the sequence of data element indices of the data array.

Example 39 is the method of Example 38, including processing the data elements in a sequence of loop iterations, wherein the data element processed in a loop iteration is the data element having the number of the loop iteration as changed index.

Example 40 is the method of any one of Examples 22 to 39, wherein the memory includes a random-access memory, a non-volatile memory, a read-only memory or one or more processor registers.

Example 41 is the method of any one of Examples 22 to 40, including processing the data elements for performing a cryptographic method and wherein the data elements contain data to be cryptographically processed by the cryptographic method.

Example 42 is the method of any one of Examples 22 to 41, wherein the data elements include data to be decrypted or to be encrypted, a cryptographic key, data for a cryptographic key exchange and/or a cryptographic signature.

According to a further example, a security controller is provided including storing means for storing a data array, wherein the data array has a number of data elements given by a length of the data array, a first determining means for determining a power of two such that number of data elements is higher than the power of two but at most equal to double the power of two, a second determining means for determining a random first integer, a third determining means for determining a random second integer and a changing means for changing indices of a predefined sequence of indices between zero and the length of the data array minus one, wherein changing an index includes Performing a first change of the index if the index is lower than the power of two, wherein the first change includes changing the index according to a first permutation of non-negative numbers smaller than the power of two and wherein the first permutation depends on the random first integer;

Performing a second change of the index, wherein the second change includes adding a third integer to the index modulo data array length; and Performing a third change of the index if the index, following the second change, is lower than the power of two, wherein the third change includes changing the index according to a second permutation of non-negative numbers smaller than the power of two and wherein the second permutation depends on the random second integer; and processing the data elements in an order given by the changed indices.

The security controller further includes a processing means for processing the data elements in an order given by the changed indices.

In an embodiment, a "circuit" (in particular a "processing circuit") may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g. a Complex Instruction Set Computer (CISC) processor or a Reduced Instruction Set Computer (RISC) processor). A "circuit" may also be a processor executing software, e.g., any kind of computer program, e.g. a computer program using a virtual machine code such as e.g. Java. Any other kind of implementation of the respective functions described herein may also be understood as a "circuit" in accordance with an alternative embodiment.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A security controller comprising
a memory storing data elements of a data array, wherein the data array has a number of data elements given by a length of the data array, and
a processing circuit configured to:
determine a power of two such that the number of data elements is higher than the power of two but at most equal to double the power of two;
determine a random first integer;
determine a random second integer;
change indices of a predefined sequence of indices between zero and the length of the data array minus one, wherein changing an index comprises:
performing a first change of the index if the index is lower than the power of two, wherein the first change comprises changing the index according to a first permutation of non-negative numbers smaller than the power of two and wherein the first permutation depends on the random first integer;
performing a second change of the index, wherein the second change comprises adding a third integer to the index modulo data array length; and
performing a third change of the index if the index, following the second change, is lower than the power of two, wherein the third change comprises changing the index according to a second permutation of non-negative numbers smaller than the power of two and wherein the second permutation depends on the random second integer; and
process the data elements in an order given by the changed indices.

2. The security controller of claim 1, wherein the first permutation is one of: an addition of the random first integer modulo the data array length, a multiplication by the random first integer modulo the data array length, a bitwise exclusive-or combination with the random first integer, and a bitwise rotation by the random first integer.

3. The security controller of claim 1, wherein the first permutation is a bitwise exclusive-or and the random first integer is a non-negative integer.

4. The security controller of claim 1, wherein the first permutation is a multiplication modulo the data array length and the random first integer is an odd positive integer.

5. The security controller of claim 1, wherein the second permutation is one of an addition of the random second integer modulo the data array length, a multiplication by the random second integer modulo the data array length, a bitwise exclusive-or combination with the random second integer or a bitwise rotation by the random second integer.

6. The security controller of claim 1, wherein the second permutation is a multiplication modulo the data array length and the random second integer is an odd positive integer.

7. The security controller of claim 1, wherein the second permutation is a bitwise exclusive-or and the random second integer is a non-negative integer.

8. The security controller of claim 1, wherein the third integer is an integer predetermined to have a remainder modulo the data array length which is between the data array length minus the power of two and the power of two.

9. The security controller of claim 1, wherein the first permutation is a multiplication by the random first integer modulo the data array length and the second permutation is a multiplication modulo the data array length by the random second integer.

10. The security controller of claim 9, wherein the random first integer and the random second integer are odd positive integers.

11. The security controller of claim 9, wherein the random first integer and the random second integer are smaller than the power of two.

12. The security controller of claim 9, wherein the third integer is the power of two.

13. The security controller of claim 9, wherein the processing circuit is configured to determine a random fourth integer and changing the index further comprises performing a fourth change of the index, wherein the fourth change comprises adding the random fourth integer to the index modulo data array length.

14. The security controller of claim 13, wherein the fourth integer is a non-negative integer smaller than the data array length.

15. The security controller of claim 1, wherein the sequence of indices is a sequence of indices of loop iterations.

16. The security controller of claim 15, wherein each data element has a data element index specifying its position in the data array and wherein the processing circuit is configured to process the data elements in a sequence of loop iterations, wherein the data element processed in a loop iteration is the data element having the data element index equal to the changed loop iteration index of the loop iteration.

17. The security controller of claim 1, wherein each data element has a data element index specifying its position in the data array and the sequence of indices is the sequence of data element indices of the data array.

18. The security controller of claim 17, wherein the processing circuit is configured to process the data elements in a sequence of loop iterations, wherein the data element processed in a loop iteration is the data element having the number of the loop iteration as changed index.

19. The security controller of claim 1, wherein the memory comprises a random-access memory, a non-volatile memory, a read-only memory or one or more processor registers.

20. The security controller of claim 1, wherein the processing circuit is configured to process the data elements for performing a cryptographic method and wherein the data elements contain data to be cryptographically processed by the cryptographic method.

21. The security controller of claim 1, wherein the data elements comprise data to be decrypted or to be encrypted, a cryptographic key, data for a cryptographic key exchange and/or a cryptographic signature.

22. A method for processing data elements of a data array stored in a memory of a security controller, wherein the data array has a number of data elements given by a length of the data array, the method comprising:
determining a power of two such that number of data elements is higher than the power of two but at most equal to double the power of two;
determining a random first integer;
determining a random second integer;
changing indices of a predefined sequence of indices between zero and the length of the data array minus one, wherein changing an index comprises:

performing a first change of the index if the index is lower than the power of two, wherein the first change comprises changing the index according to a first permutation of non-negative numbers smaller than the power of two and wherein the first permutation depends on the random first integer;

performing a second change of the index, wherein the second change comprises adding a third integer to the index modulo data array length; and performing a third change of the index if the index, following the second change, is lower than the power of two, wherein the third change comprises changing the index according to a second permutation of non-negative numbers smaller than the power of two and wherein the second permutation depends on the random second integer; and processing the data elements in an order given by the changed indices.

\* \* \* \* \*